(12) United States Patent
Tolliver et al.

(10) Patent No.: US 8,548,238 B2
(45) Date of Patent: Oct. 1, 2013

(54) METHOD FOR PARTITIONING COMBINATORIAL GRAPHS

(75) Inventors: David Allen Tolliver, Pittsburgh, PA (US); Gary L. Miller, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 827 days.

(21) Appl. No.: 12/150,994

(22) Filed: May 2, 2008

(65) Prior Publication Data

US 2009/0028433 A1 Jan. 29, 2009

Related U.S. Application Data

(60) Provisional application No. 60/927,360, filed on May 3, 2007.

(51) Int. Cl.
*G06K 9/34* (2006.01)

(52) U.S. Cl.
USPC .......................... 382/173; 382/199; 382/225

(58) Field of Classification Search
USPC .................... 382/173, 199, 224, 225
See application file for complete search history.

(56) References Cited

U.S. PATENT DOCUMENTS

| 2002/0048401 | A1* | 4/2002 | Boykov et al. | 382/173 |
|---|---|---|---|---|
| 2003/0174889 | A1* | 9/2003 | Comaniciu et al. | 382/173 |
| 2004/0156544 | A1* | 8/2004 | Kajihara | 382/167 |
| 2007/0014473 | A1* | 1/2007 | Slabaugh et al. | 382/173 |
| 2008/0159590 | A1* | 7/2008 | Yi et al. | 382/103 |

OTHER PUBLICATIONS

Chennubholta et al. "Half-Lives of EigenFlows for Spectral Clustering," 2002, pp. 1-8.*
Shi et al., "Normalized Cuts and Image Segmentation," Aug. 2000, IEEE, vol. 22, pp. 888-905.*
Cour, Timothee, Gogin, Nicolas, Shi, Jianbo; Learning spectral graph segmentation; http://www.cis.upenn.edu/~jshi/papers/AISTATS2005.pdf; Jan. 6, 2005.
Meila, Marina, Shi, Jianbo; Learning Segmentation by Random Walks; http://www.cis.upenn.edu/~jshi/papers/nips00_maila_shi.pdf; Dec. 3, 2001.
Shi, Jianbo, Malik, Jitendra; Normalized Cuts and Image Segmentation; IEEE Transactions on Pattern Alalysis and Machine Intelligence; 22(8):888-905; 2000.
Chennubhotla, Chakra, Jepson, Allan D.; Half-Lives of EigenFlows for Spectral Clustering; Advances in Neural Information Processing Systems, 2002.
Anstreicher, Kurt, Wolkowicz, Henry; On Lagrangian Relaxation of Quadratic Matrix Constraints; SIAM Journal Matrix Analysis Applications, 22(1); pp. 44-55; 2000.

(Continued)

*Primary Examiner* — John Strege
(74) *Attorney, Agent, or Firm* — Jones Day

(57) ABSTRACT

A method of partitioning a weighted combinatorial graph representative of a dataset consists of the steps of generating a generalized Laplacian matrix corresponding to the combinatorial graph, computing the eigenstructure of the generalized Laplacian matrix, determining if an end criterion is satisfied using the eigenstructure, and if the end criterion is not satisfied, calculating new values for at least some of the plurality of weighting factors using the eigenstructure, updating the combinatorial graph with the new values for at least some of the weighting factors, and returning to the generating step.

28 Claims, 4 Drawing Sheets

(56) References Cited

OTHER PUBLICATIONS

Arora, Sanjeev, Rao, Satish, Vazirani, Umesh; Expander Flows, Geometric Embeddings and Graph Pardoning; in STOG; pp. 222-231; 2004.

Bach, Francis, Jordan, Michael; Learning Spectral Clustering, With Application to Speech Separation; Journal of Machine Learning Research, 7; pp. 1963-2001; 2006.

Chan, Tony, Gilbert, John, Teng, Shang-Hua; Geometric Spectral Bisection; Manuscript; 1994.

Chung, Fan; Spectral Graph Theory; Conference Board of the Mathematical Sciences, Regional Conference Series in Mathematics, No. 92; 1994.

Demmel, James; Applied Numerical Linear Algebra; SIAM; 1997.

Fowlkes, Charless, Belongie, Serge, Malik, Jitendra; Efficient Spatiotemporal Grouping Using the Nystrom Method; in PAMI; 2003.

Karypis, George, Kumar, Vipin; A Fast and High Quality Multilevel Scheme for Partitioning Irregular Graphs; SIAM, Journal of Scientific Computing; 1998.

Guattery, Stephen, Miller, Gary; On the Quality of Spectral Separators; Matrix Analysis, 19(3); 1998.

Jerrum, Mark, Sinclair, Alistair; Approximating the Permanent; SIAM Journal on Computing, 18(6); pp. 1149-1178; 1989.

Lang, Kevin, Rao, Satish; A Flow-Based Method for Improving the Expansion or Conductance of Graph Cuts; Integer Programming and Gombinatorial Optimization; pp. 325-337; 2004.

Leighton, Tom, Rao, Satish; An Approximate Max-Flow Min-Cut Theorem for Uniform Multicommodity Flow Problems with Applications to Approximation Algorithms; IEEE Foundations of Computer Science; pp. 422-431; 1988.

Ng, Andrew, Jordan, Michael, Weiss, Yair; On Spectral Clustering: Analysis and Algorithm; in NIPS; 2002.

Saad, Yousef; Iterative Methods for Sparse Linear Systems; 2000.

Spielman, Daniel, Teng, Shang-Hua; Nearly Linear Time Algorithms for Graph Partitioning, Graph Sparsification, and Solving Linear Systems; STOC; pp. 81-90; 2004.

Tolliver, David, Miller, Gary; Graph Partitioning by Spectral Rounding: Applications in Image Segmentation and Clustering; IEEE Computer Vision and Pattern Recognition; pp. 1053-1060; 2006.

Tolliver, David; Spectral Rounding & Image Segmentation; PhD Thesis, Carnegie Mellon University; 2006.

Xing, Eric, Jordan, Michael; On Semidefinite Relaxation for Normalized k-cut and Connections to Spectral Clustering; Report No. UCB/CSD-3-1265, University of California, Berkley; 2003.

Yu, Stella, Shi, Jianbo; Multiclass Spectral Clustering; in ICCV; 2003.

\* cited by examiner

US 8,548,238 B2

METHOD FOR PARTITIONING COMBINATORIAL GRAPHS

CROSS REFERENCE TO RELATED APPLICATIONS

The present application claims priority from application Ser. No. 60/927,360 entitled Method for Partitioning Combinatorial Graphs, filed May 3, 2007, which is hereby incorporated by reference for all purposes.

STATEMENT REGARDING FEDERALLY-SPONSORED RESEARCH AND DEVELOPMENT

This invention was made, in part, with government support under Grant Numbers CCR-9902091, CCR-9706572, ACI 0086093, CCR-0085982 and CCR-0122581 awarded by the National Science Foundation. The United States government may have certain rights in this invention.

BACKGROUND

The present invention relates to computational methods for a computer to partition a combinatorial graph and, more particularly, a method for partitioning a weighted combinatorial graph using the eigenvalues and eigenvectors derived from the normalized Laplacian of the graph.

A variety of problems in computer science, statistics, and signal processing can be formulated as partitioning a weighted combinatorial graph. Examples include the segmentation of digital signals, i.e., decomposing a digital signal representative of audio [3], image [15], or volumetric data [7] into pieces (segments). For example, FIG. 1 is a pictorial illustration of partitioning a weighted combinatorial graph used for image segmentation. In FIG. 1, an overall image 10 contains an image of a dog that is to be segmented from the remainder of the overall image 10. The overall image 10 may be represented by a combinatorial graph 12. Combinatorial graphs are structures in which each pixel, or feature, in the image becomes a vertex in the graph. Neighboring vertices (pixels) are connected to one another with an edge. Each edge has a weight assigned to it that corresponds to the similarity of the pixels that edge connects. The construction of combinatorial graphs is known and not the subject of this disclosure. After the combinatorial graph is generated, partitioning of the graph may be performed along those edges between weakly related pixels on the theory that closely related pixels are from the same object while weakly related pixels may be from a different object. Of course, the problem is not that simple. For example, the dog in FIG. 1 could be a Dalmatian. In that case, we would not want each spot on the dog's coat to be identified as a new object. Putting aside such complexities for the moment, the partitioning of graph 12 produces the segmented image 14.

Graph partitioning plays a crucial role in many numerical algorithms, for example, in solving linear systems [16], partial differential equations [14], and physical simulation [14]. In statistics, graph partitioning is employed as a clustering tool [13] and in the analysis of mixing times of stochastic processes [10]. In the design of efficient algorithms, graph partitioning provides well-conditioned decompositions of the problem into pieces for divide-and-conquer methods [14]. In general, finding the best partitioning of a graph under some figure-of-merit results in a Non-deterministic Polynomial-time hard (NP-hard) mathematical optimization problem. In the applications mentioned above, the figures-of-merit fall into the quotient cut family of metrics. These metrics are minimized at the equilibrium between the cost associated with breaking edges in the graph and the balance in the relative sizes of the partitions. Such metrics, in the quotient cut family, seek equitable partitions of the graph.

Historically, graph partitioning methods have fallen into one of the three common paradigms: heuristic, linear and semi-definite programming, or spectral methods. Heuristic methods provide no quality guarantees on the solutions they generate in terms of a figure-of-merit. METIS [8] is an example of a heuristic partitioner. Heuristic methods tend to be fast and have found wide application in the implementation of divide-and-conquer style algorithms [14]. The two mathematical paradigms for approximating graph partitioning objective functions are 1) linear or semi-definite programming [19, 2, 12] and 2) spectral methods [5]. The methods in these two families provide guarantees on the cut quality in terms of a figure-of-merit. The LP/SDP-programming style methods suffer from a high polynomial time and memory complexity, limiting the size of the graphs they can partition. Spectral methods, while carrying weaker guarantees, can be applied to very large graphs while providing some guarantee on the quality.

The disclosed method is a novel spectral technique that empirically improves upon existing spectral algorithms for quotient cuts. Earlier spectral methods consisted of a two-stage algorithm. In the first stage, a small collection of, say k, eigenvectors of a graph Laplacian, with small eigenvalues, are computed. Each of these eigenvectors provides a real number for each vertex in the graph. Taken together, the eigenvectors provide a map for the graph vertices into $\Re^k$. The vertices of the graph, now represented by points in space, are then clustered into a small collection of sets and these cluster memberships are taken to be the partition memberships for the graph [4]. This second stage is referred to as rounding, in which the continuous eigenvectors are mapped onto discrete partition indicator vectors. Recently, Lang and Rao have proposed a flow-based technique [11] that bests most geometric rounding methods for quotient 2-cuts of a graph. However, like geometric rounding methods, the hybrid method of Lang and Rao projects continuous solutions (such as eigenvectors) onto the feasible set in a single flow computation. This requires that the correct partition be well represented in the minimal eigenspace passed to the rounding step. Recent papers have exhibited graphs that do not satisfy this property [9].

The method disclosed herein replaces the direct rounding step (geometric or flow-based) with an iteration that reweights the graph in such a fashion that it eventually disconnects. Each iteration uses the eigenvalues and eigenvectors of the reweighted graph Laplacian to determine new edge weights. This iteration effects a rounding of the input vectors when the graph disconnects. By using the eigenvector from the previous iteration as a starting point for finding the new eigenvector, simple and efficient inverse powering methods converge in a small number of steps making the method computationally efficient.

SUMMARY

An objective of the present disclosure is achieved by providing a computer the means to partition a weighted combinatorial graph into k disjoint components in quasi-linear to polynomial time with a low observed quotient cut cost. This document discloses a new method for projecting continuous approximations of the partition indicator matrices, in the form of generalized eigenvectors of graph Laplacians, onto the feasible set of partition indicator matrices. The method comprises four main steps, namely (1) the construction of a weighted combinatorial graph G from a data set taken as input; (2) the computation of the generalized eigenstructure of the Laplacian of G; (3) the determination of an update weighting of G such that a linear combination of generalized eigenvalues is decreased; and (4) the iteration of steps 2 and 3 until termination is achieved.

As the output of the first step is taken as input to the described method, we begin with the second step. The second step computes a set of generalized eigenvalues and vectors of the Laplacian of the input graph G=(V, E, w). This requires the construction of the Laplacian L, a sparse n×n symmetric, weakly diagonally dominant matrix, and weighted Degree matrix D, a positive diagonal matrix, from the graph G=(V, E, w). The k' smallest generalized eigenvalues $\lambda_i$ of (L, D) are computed as well as their associated eigenvectors $f_i$. The generalized eigenstructure is exactly the sets of solutions to the following linear equality $Lf_i = \lambda_i D f_i$.

The third step is, given a weighted graph $G^{(j)}=(V, E, w^{(j)})$, determining a new weighting $w^{(j+1)}$ such that a linear combination of the generalized eigenvalues of $(L^{(j+1)}, D^{(j+1)})$ is less than $(L^{(j)}, D^{(j)})$. This is the primary focus of this document and is described in detail below. Briefly, reweightings are determined by combining $w^j$, $f_i^{(j)}$, $\lambda_i^{(j)}$ for i=1 to k' into a single reweighting of the graph such that the reweighted median and combination of eigenvalues is decreased.

The fourth and final step consists of iterating steps (2) and (3) until convergence is achieved. Termination is defined as the condition at which the prescribed generalized eigenvalue $\lambda_k$ reach zero for some k<k'. In a subsequent section, the convergence and termination conditions will be shown to be the same. The repeated application of steps (2) and (3) drives the $k^{th}$ smallest generalized eigenvalue to zero thereby partitioning G into k disjoint pieces (sub-graphs). Thus, the partitioning is produced by iteratively reweighting the graph G, based on structure of a suite of generalized eigenvectors of the normalized Laplacian matrix of G. The reweighting produces a finite set of reweighted instances of G, the generalized eigenvectors of which are used to drive a set of the edges of G to zero such that G is disconnected (partitioned) into the prescribed number of pieces.

This invention describes a computational method for a computer to quickly find near optimal solutions to NP-hard graph partitioning problems in the "quotient cut" family. These and other advantages and benefits will be apparent from the detailed description appearing below.

BRIEF DESCRIPTION OF THE DRAWINGS

For the present disclosure to be easily understood and readily practiced, preferred embodiments will now be described, for purposes of illustration and not limitation, in connection with the following figures, wherein.

DESCRIPTION OF PREFERRED EMBODIMENTS

Overview

Figure 1:
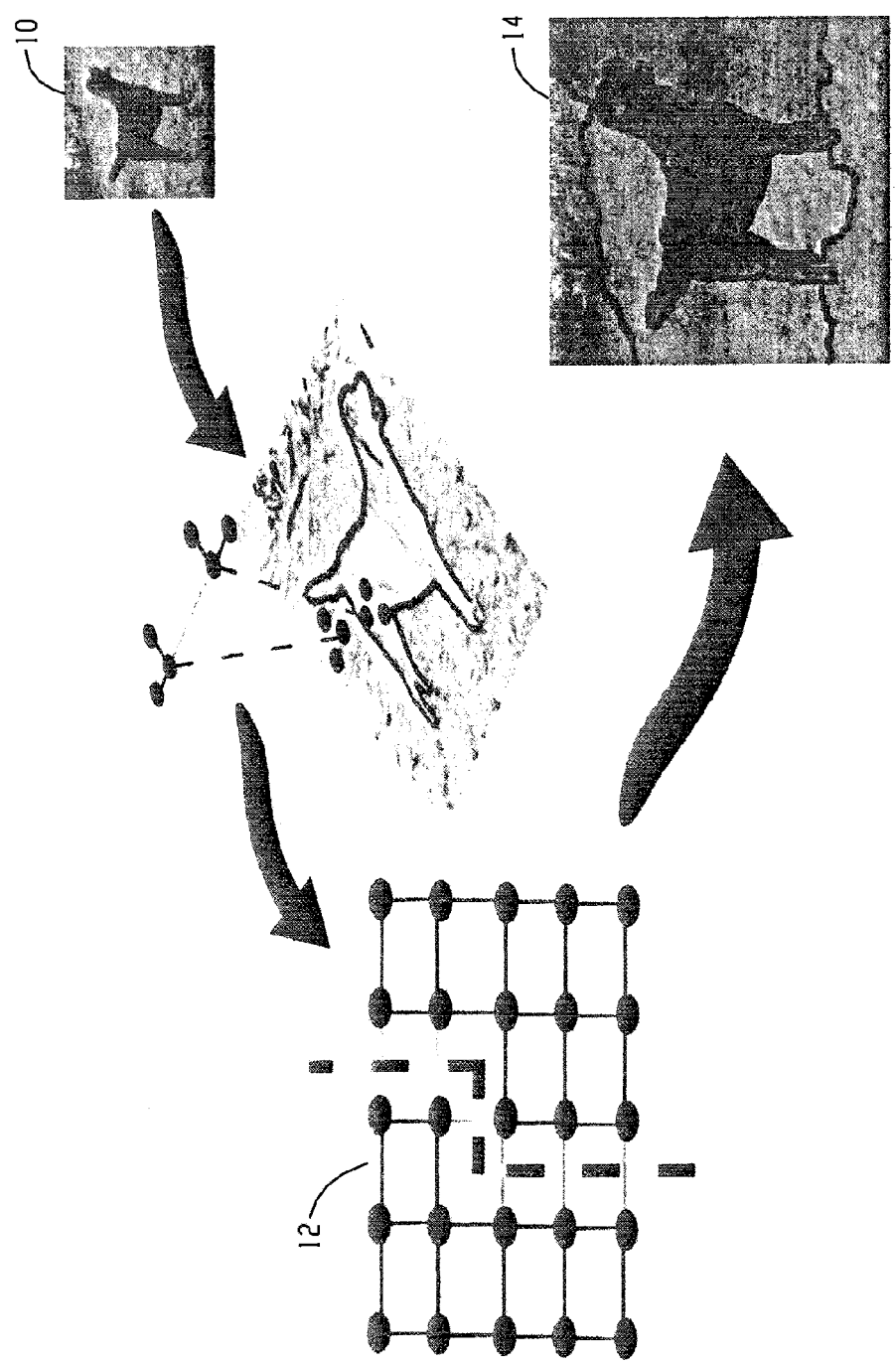
FIG. 1 is a pictorial representation of partitioning a weighted combinatorial graph used for image segmentation.
Figure 2:
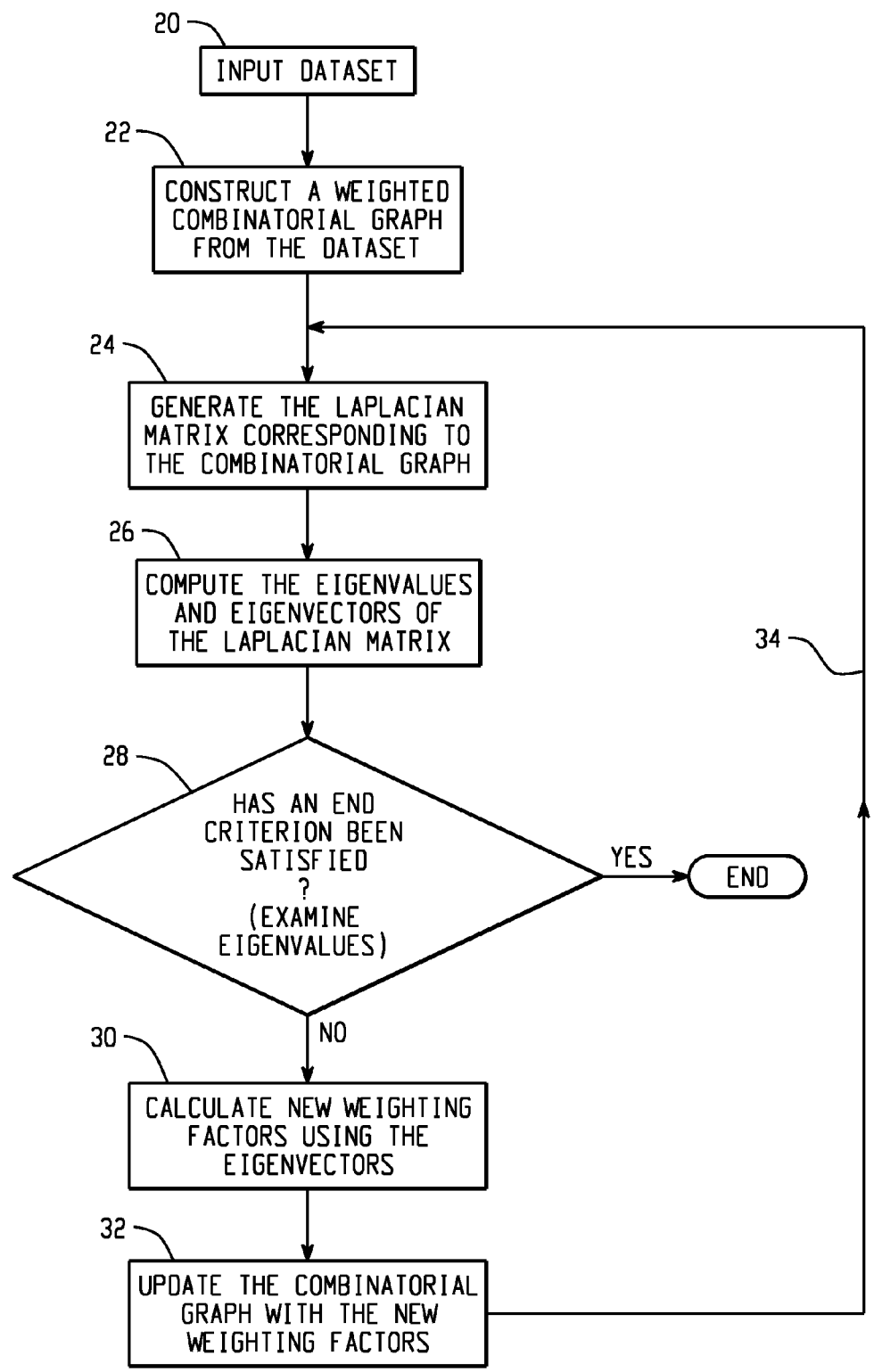
FIG. 2 is a diagram illustrating the disclosed method according to one embodiment.

Turning to FIG. 2, a diagram illustrating the disclosed method according to one embodiment is illustrated. In FIG. 2, the process starts with the receipt of an input dataset at 20. As mentioned in the background, the input dataset could be representative of audio signals, images, volumetric data, etc. At 22, a combinatorial weighted graph is constructed from the dataset using known techniques. The particular technique used to construct the combinatorial weighted graph is not important to the practicing of the disclosed spectral rounding method. At 24, the Laplacian matrix corresponding to the combinatorial graph is generated. The particular technique used to generate the Laplacian matrix is not important to the practicing of the disclosed spectral rounding method.

After the Laplacian matrix is generated, the eigenstructure, i.e., the eigenvalues and eigenvectors, of the Laplacian matrix are computed. Although the particular method used to calculate the eigenvalues and eigenvectors is not important to the practicing of the disclosed spectral rounding method, we prefer to use the method of computing the generalized eigenstructure disclosed in I. Koutis, G. Miller, "A linear work, $O(n\char`^\{1/6\})$ parallel time algorithm for solving planar Laplacians," SODA: SIAM Symposium on Discrete Algorithms (SODA 2007), which is hereby incorporated by reference for all purposes.

After the generalized eigenstructure of the Laplacian matrix is computed, the eigenvalues are examined to determine if an end criterion has been satisfied at 28. Various different end criterion may be used. For example, one end criterion is to determine if the eigenvalue has reached zero. Another end criterion could include determining if the reweighting and iteration steps show no further improvement. Yet another end criterion could involve some subjective user input as to what is considered to be a satisfactory solution. Those of ordinary skill in the art will recognize that many different end criterion may be used. If at 28 the end criterion is satisfied, the process terminates (ends). If at 28 the end criterion is not satisfied, the process continues at 30 with the calculation of new weighting factors using the eigenvectors as a starting point. The calculation of the new weighting factors is described in detail below. The new weighting factors are used at 32 to update the combinatorial graph. The process then returns via loop 34 to step 24 from which the process repeats until the end criterion is satisfied.

Figure 3:
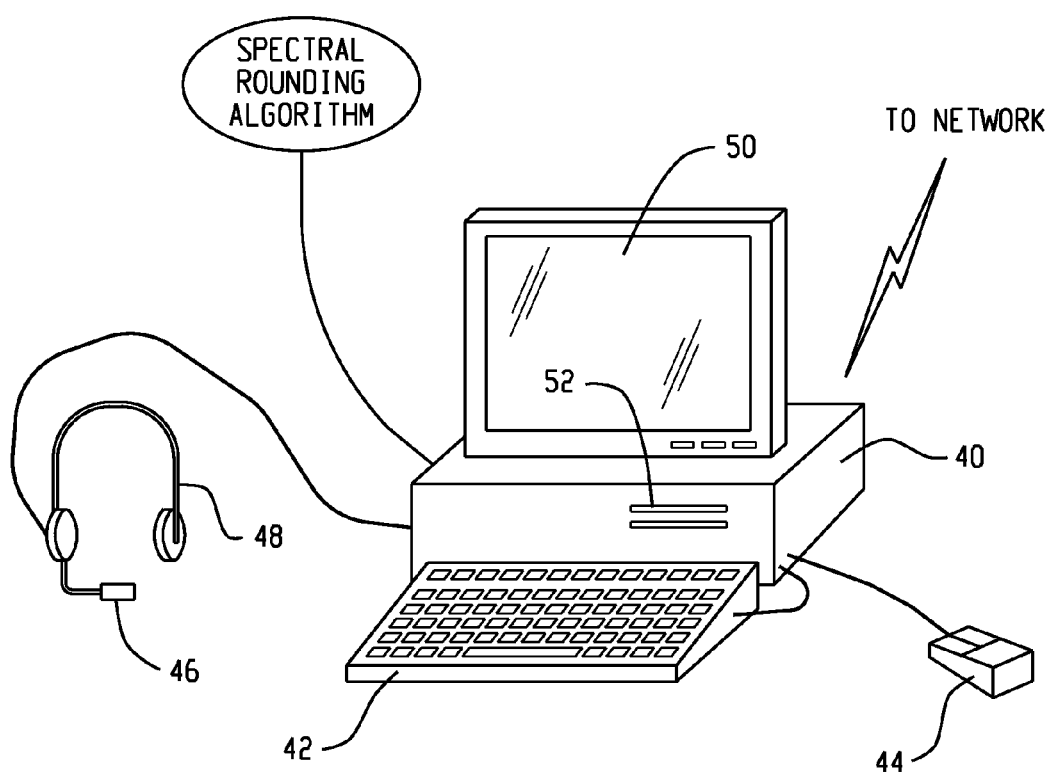
FIG. 3 is an example of hardware upon which the method disclosed in FIG. 2 can be practiced.

The disclosed spectral rounding method may be practiced on a wide variety of hardware configurations. One example of such a hardware configuration is illustrated in FIG. 3. In FIG. 3, a computer 40 is shown having various input devices such as keyboard 42, mouse 44, microphone 46, among others. The computer is also shown having various output devices such as headphones 48 and monitor 50, among others. The disclosed spectral rounding algorithm may be carried on the hard drive of the computer 40, loaded onto the computer 40 via a computer readable disc inserted into one of the computer's disc drives 52, or accessed via a network connection. The reader will understand that the disclosed spectral rounding algorithm may be practiced on computer 40 alone, or as part of a parallel processing network in which computer 40 is one node. The generality of the disclosed spectral rounding algorithm is not intended to be limited by the particular hardware configuration used to practice the disclosed method.

Notation

The present disclosure relates to weighted graphs of the form G=(V, E, w). There is a natural isomorphism between graphs and their Laplacians. Throughout this paper we let G=(V, E, w) denote an edge weighted undirected graph without multiple edges or self loops, where V is a set of n vertices numbered from 1 to n, E is a set of m edges, and w: E→[0, 1] is the edge weighting.

We associate four matrices with the graph: First, W the weighted adjacency matrix, $$W_{ij} = \begin{cases} w_{ij} = w(i, j) & \text{if } (i, j) \in E \\ 0 & \text{otherwise} \end{cases}$$

The weighted degree of vertex i is $d_i = \Sigma_{j=1} w_{ij}$. We assume that no vertex has zero degree.

Second, the weighted degree matrix D is $$D_{ij} = \begin{cases} d_i & \text{if } i = j \\ 0 & \text{otherwise.} \end{cases}$$

Third, the generalized Laplacian or simply the Laplacian of G is L=D−W and the fourth is the normalized Laplacian $\hat{L}= D^{-1/2} L D^{-1/2}$.

A valuation function of the vertices of G is a function $f$: V→$\Re$, that is, a map that assigns a real number to each of the vertices. A vector in the nullspace of (L, D) is a valuation such that $Lf_i = 0 \cdot Df_i$. The dimensionality of the nullspace is the number of D-orthogonal vectors $f_i^T D f_j = 0$ satisfying the nullspace equality. Note, that the number of connected components in G is equal to the dimensionality of the nullspace of (L, D).

The generalized eigenvalues and eigenvectors of (L, D) are the solutions of $Lf = \lambda Df$. In this case the normalized Rayleigh quotient of the valuation $f$ is $f^T Lf/f^T Df$. The generalized eigenvalues of (L, D) are all real numbers and bound from below by $\lambda_1 = 0$, by convention we order the generalized eigenvalues of (L, D) as $0 = \lambda_1 \leq \lambda_2 \leq \ldots \leq \lambda_n$.

We make a simple, but important, observation about the Rayleigh quotient $f^T Lf/f^T Df$: given a weighted symmetric graph G=(V, E, w) then the normalized Rayleigh quotient can be written a:

$$\frac{f^T Lf}{f^T Df} = \frac{\sum_{(i,j) \in E, i<j} (f_i - f_j)^2 w_{ij}}{\sum_{(i,j) \in E, i<j} ((f_i)^2 + (f_j)^2) w_{ij}} \quad (3)$$

where $f_i = f(v_i)$. The main importance of the above equation is that for each valuation $f$ and each edge $e_{ij}$ in E we get the fraction $$\frac{(f_i - f_j)2}{(f_i)^2 + (f_j)^2}.$$

We further note that the above Rayleigh quotient computes the weighted mediant of this set of fractions.

The mediant of a set of fractions $$\frac{a_1}{b_1} \leq \ldots \leq \frac{a_n}{b_n}$$

is defined as $$\frac{\sum_i a_i}{\sum_i b_i}, \text{ and } \frac{\sum_i w_i a_i}{\sum_i w_i b_i}$$

is the weighted mediant. Note that the mediant is distinct from the geometric mean of a set of fractions. However, the mediant shares numerous properties with the geometric mean, for example, the value of the mediant lies between the largest $$\frac{a_n}{b_n}$$

and smallest $$\frac{a_1}{b_1}$$

fractions.

A quotient cut of the graph G=(V, E, w) attempts to minimize the ratio of cost of the cut (i.e., the sum of the weights associated with the edges whose removal disconnects the graph) and the size of the resulting partitions. In this way it seeks to balance the size of each sub-graph (proportional to the total weight in the sub-graph) with the cost of the cut. A graph is taken to be an expander graph if its quotient cut function is bound from below by a constant.

The partition indicator matrix (PIM) associated with a cut is an (n×k) matrix with a single one in each row and column. Note, for a PIM P that the quotient cut cost is proportional to trace $((P^T DP)^{-1}(P^T LP))$. The relaxation of the search over matrices P minimizing this function to continuous vectors is one of the early derivations of eigenstructure-based approaches [1].

Computation of the Generalized Eigenvalues of A, D

As described in the summary section, the second step of the method is the computation of k' generalized eigenpairs with small value. The generalized eigenvectors $f_i$ and eigenvalues $\lambda_i$ of the matrix pencil (L, D) are the solutions to the equation $$Lf_i = \lambda_i Df_i$$

By convention, the generalized eigenvalues $\lambda_i$ are ordered such that $0 = \lambda_1 \leq \ldots \leq \lambda_n n$. The extremal values of (A, D) are computed using existing software from the public domain for sparse numerical linear algebra packages [6], (i.e., LAPACK). The manner in which the generalized eigenvector associated with the smallest k' generalized eigenvalues are employed by the disclosed spectral rounding method to effect a partitioned graph is described in the next.

Determining a Suitable Reweighting of G

As described in the summary section, the third step of the method determines a suitable reweighting of the graph G such that repeated application of the reweighting disconnects the graph. This begins with the necessary condition for decreasing linear combinations of generalized eigenvalues of the matrix pencil (L, D). The condition depends on a set of novel observations in relation to rounding the generalized eigenvectors of (L, D) to obtain a partitioning of the graph. In particular, we note that the dimensionality of the nullspace of L' is equal to the number of connected components in G under the weighting w'.

In particular, for a fixed valuation function $f: V \to \Re$, there exists a reweighting w' of the graph G=(V, E, w) such that $$\frac{f^T L' f}{f^T D' f} < \frac{f^T L f}{f^T D f}$$

where (L', D') is the matrix pair on G=(V, E, w') corresponding to the reweighting w'. The above inequality will be referred to as the Rayleigh quotient constraint in subsequent sections. Next it is shown that, if the vector $f$ is a generalized eigenvector of the matrix pair (L, D), the eigenvalue is decreased as well.

Given a weighted graph G=(V, E, w), matrices L and D, the simple eigenpair $(f, \lambda) | Lf=\lambda Df$, and a new weighting w' such that $$\frac{f^T L' f}{f^T D' f} < \frac{f^T L f}{f D f} = \lambda$$

then the derivative of the generalized eigenvalue function $\lambda(t)$ of the reweighting matrix curve W(t)=W+tW' is well defined for small t and $$\frac{d\lambda(t)}{dt} < 0$$

at t=0. For a simple eigenpair $(f, \lambda)$, recall that $$\frac{f^T L f}{f^T D f} = \lambda,$$

as W(0)=W and thus L(0)=L, D(0)=D by definition. The bound on $$\frac{d\lambda(t)}{dt}$$

on is deduced from the observation that this derivative may be written as $$\frac{d\lambda(t)}{dt} = \left(\frac{f^T L' f}{f^T D' f} - \frac{f^T L f}{f^T d f}\right) f^T D' f$$

Thus, if the Rayleigh quotient constraint holds for the reweighting, the eigenvalue derivative is negative, and the associated eigenvalue must decrease along the matrix curve over the reweighting. These observations have been generalized to multiple eigenvalues by the inventors in reference [18, 17].

Two example reweighting schemes, that provide reweightings satisfying the Rayleigh quotient constraint, are given below. Those skilled in the art can development many more valid reweighting schemes that satisfy the Rayleigh quotient constraint. The first concerns reweighting a single valuation and the second concerns reweighting multiple valuations simultaneously.

The first example, proposed in [17], is proportionality to the reciprocal of the edge fractions $$r_{ij} \frac{(f_i - f_j)^2}{(f_i^2 + f_j^2)}.$$

That is, the new weighting $w'_{ij} = w_{ij} \cdot g(r_{ij}^{-1})$. Where g is any monotone function mapping the interval $[0, \infty]$ to $[0, 1]$ (for example, the stereographic projection or $1 - e^{-c \cdot r_{ij}}$). Recall that a function is monotone over a set, if it is order preserving. Intuitively, the reciprocal reweighting applies large weight to the smallest edge fractions and small weight to the edge fractions with large value. This simple reweighting can be applied to an arbitrary eigenpair $(f_k, \lambda_k)$ satisfying $Lf_k = \lambda_k D f_k$. Through a basic property of linear algebra driving $\lambda_k$ to zero ensures that $\lambda_1 = \ldots = \lambda_{k-1} = \lambda_k = 0$. The reweighting where $\lambda_k = 0$, ensures that the dimensionality of the nullspace of (L', D') is k, thus the graph is partitioned into k pieces, and the termination condition (i.e., end criterion) for the method is achieved.

The second concerns reweighting using multiple eigenvectors. For simplicity, the example only concerns two but trivially generalizes to more eigenvectors. As an intuition, using multiple eigenvectors result in a mediant of mediants calculation, and therefore, the Rayleigh quotient constraint carries through to multiple valuations.

For a weighted graph G=(V, E, w) with matrices L and D and simple eigenpairs $(f, \lambda_f) | Lf=\lambda_f D_f$ and $(g, \lambda_g) | Lg = \lambda_g D_g$, given a reweighting w' such that $$\frac{\frac{1}{\lambda_f} f^T L' f + \frac{1}{\lambda_g} g' L' g}{f^T D' f + g^T D' g} < \frac{\frac{1}{\lambda_f} f^T L f + \frac{1}{\lambda_g} g^T L g}{f^T D f + g^T D_g} = 1$$

then $$\frac{d\lambda_f(t)}{dt} + \frac{d\lambda_g(t)}{dt} < 0$$

at t=0. We begin by stating a related quantity of interest, the derivative of the fractional average of Rayleigh quotients on $f$ and g for the matrix curve w=w+t·w' as:

$$\frac{d}{dt}\left[\frac{\frac{1}{\lambda} f^T(t) L(t) f(t) + \frac{1}{\lambda} g^T(t) L(t) g(t)}{f^T(t) D(t) f(t) + g^T(t) D(t) g(t)}\right]$$

and examine its derivative centered at t,=0. First, we must fix the scale of the eigenvectors $f(t)$ and g(t), we choose $f(t)^T D(t) f(t) = g(t)^T D(t) g(t) = 1$ w.l.o.g. Thus, equation 5 simplifies to $$\frac{d}{dt}\left[\frac{\frac{1}{\lambda} f^T(t) L(t) f(t) + \frac{1}{\lambda_g} g^T(t) L(t) g(t)}{1 + 1}\right] = \frac{1}{2}\left(\frac{1}{\lambda_f}\frac{d}{dt}\lambda_f(t) + \frac{1}{\lambda_g}\frac{d}{dt}\lambda_g(t)\right)$$

by the linearity of the derivative. We may now substitute the functional form of $$\frac{d\lambda(t)}{dt},$$

and obtain $$\frac{1}{2}\left(\frac{1}{\lambda_f}f^T(L'-\lambda_f D')f + \frac{1}{\lambda_g}g^T(L'-\lambda_g D')g\right)$$

assume the bound holds $$\frac{1}{2}\left(\frac{1}{\lambda_f}f^T L'f - \frac{\lambda_f}{\lambda_f}f^T D'f + \frac{1}{\lambda_g}g^T L'g - \frac{\lambda_g}{\lambda_g}g^T D'g\right) > 0$$

$$\left(\frac{1}{\lambda_f}f^T L'f - f^T D'f + \frac{1}{\lambda_g}g^T L'g - g^T D'g\right) < 0$$

arriving at $$\frac{1}{\lambda_f}f^T L'f + \frac{1}{\lambda_g}g^T L'g < f^T D'f + g^T D'g$$

which is equivalent to the hypothesis above, that $$\frac{\frac{1}{\lambda_f}f^T L'f + \frac{1}{\lambda_g}g'L'g}{f^T D'f + g^T D'g} < \frac{\frac{1}{\lambda_f}f^T Lf + \frac{1}{\lambda_g}g^T Lg}{f^T Df + g^T D_g} = 1.$$

The remainder of the proof follows standard continuity arguments.

Iteration, Convergence and Termination

The previous section detailed the constraints on valid reweighting and exhibited two valid procedures. This section concerns the fourth and final step of the invention, the application of and iteration over reweightings of G.

After fixing a reweighting W', using a valid procedure, a line search is performed along the matrix curve W(t)=W+tW' to determine the setting of t, t*, at which the minimum value of $\Sigma_{i=1}^n \alpha_i \lambda_i(t)$, where $\alpha_i \geq$ and $\Sigma_{i=1}^n \alpha_i = 1$ for a fixed $\alpha$, is achieved. The combined weighting of the graph, W(t*)=W+t*W', is taken as the new weighting of G and the process is repeated until termination. This is termed application of a reweighting.

The successful termination of iteration is guaranteed by the following two observations, given here in a simplified form. First, a reweighting procedure, consistent with the Rayleigh quotient constraint, can always decrease the eigenvalues (thus has not reached a fixed point). This is formally characterized by noting that $w'=w \cdot w_r$, where $w_r$ a valid reweighting of the edges. The fixed point condition of reweighting thus requires that $w_r(e) \in {0,1}$ for all edges $e \in E(G)$. Under fixed-point conditions, the repeated application of the new weighting does not change the generalized eigenvalues of G. This only occurs when the graph is disconnected or when all the edge fractions are bound from below by 1. By the convexity property of mediants, the smallest eigenvalue $\lambda$ of (L, D) is bound from below by 1, thus the quotient cut is bound by a constant due to the Cheeger inequality and the graph is an expander. Therefore, the disclosed method has only fixed points at the proper termination conditions for all graphs excluding a set of expanders. The second observation, a standard result in real analysis (Heine-Borrel theorem), dictates that a sub-sequence of the sequence generated by the iteration must converge to a fixed point, as the sets in question: weights, eigenvalues, and eigenvectors, are all compact and closed. Therefore, the method converges and terminates, ensuring that a partitioning of the graph is achieved by applying the method above.

The Application to Digital Signal Segmentation

The application of the disclosed method to the digital signal segmentation problem requires the construction of a combinatorial graph from a digital signal. These signals could come from audio streams, images, video voxels or arbitrarily high dimensional medical or scientific scans. The goal of digital signal segmentation is to segregate a signal into collections of highly coherent components. For example, in audio processing the components might correspond to samples composing the words or syllables in the sequence. In image processing the components correspond to compact areas of the image that share a measurable quality such as color, texture, or a common boundary.

The construction of a weighted graph G=(V, E, w), where V is the vertex set, E the edge set and w a weighting of E from a digital spatial signal, is a three-stage process. The resolution, isotropic or otherwise, must be established. This stage assigns samples to vertices in the graph and ultimately determines the size of the graph. The second stage establishes the topology of the graph G. This step determines the members of the edge set E of G, two vertices u and v in V are said to be adjacent if the edge (uv) is in E. The third stage performs a sequence of comparisons between adjacent vertices based on the signal samples associated with the vertices comprising the edge. This framework procedure produces a weighted combinatorial graph G from a digital signal—the segmentation of which can then be accomplished by partitioning G using the computation method described above.

The construction is as follows: a vertex in G for each element in the digital signal—for example if the digital signal is derived from a standard digital photograph, each pixel in the image will correspond to a signal vertex in V. The vertices are then connected to neighboring samples by edges in E which are weighted in proportion to the similarity between elements at the observed sites. For example, in the case of the standard 4-connected mesh of a 2D image, this comprises approximately 4 comparisons per pixel, as each pixel is compared to its neighbors to the North, South, East, and West. The measured level of similarity is then used to weight the corresponding edge in G.

There are numerous other applications that require the construction of a graph from supporting data. These include social network analysis (finding communities in a social network), in which the graph edges and weights might correspond to the frequency of emails between parties. Clustering of amino acids in proteins in which proximity and the chemical properties of amino acid pairs determine the connectivity and weighting of the graph. These as well as numerous other applications of the reduction to graph partitioning all benefit from the partitioning method disclosed above.

Experimental Results

The parameters used in constructing a weighted graph from an image were fixed for all the results presented in this section. The graph G=(V, E, w) represents an image as follows. For each pixel in the image, a vertex in V is assigned. If two pixels are connected in E a weight in w is determined based on the image data. The graph connectivity, E, was generated by connecting pixels to 15% of their neighboring pixels in a 10 pixel radius. The initial weighting w of the graph G=(V, E, w) was determined using the Intervening Contour cue described in [15]. This cue assigns small weights to pixels that lie on opposite sides of a strong image boundary, and large weights otherwise.

Figure 4:
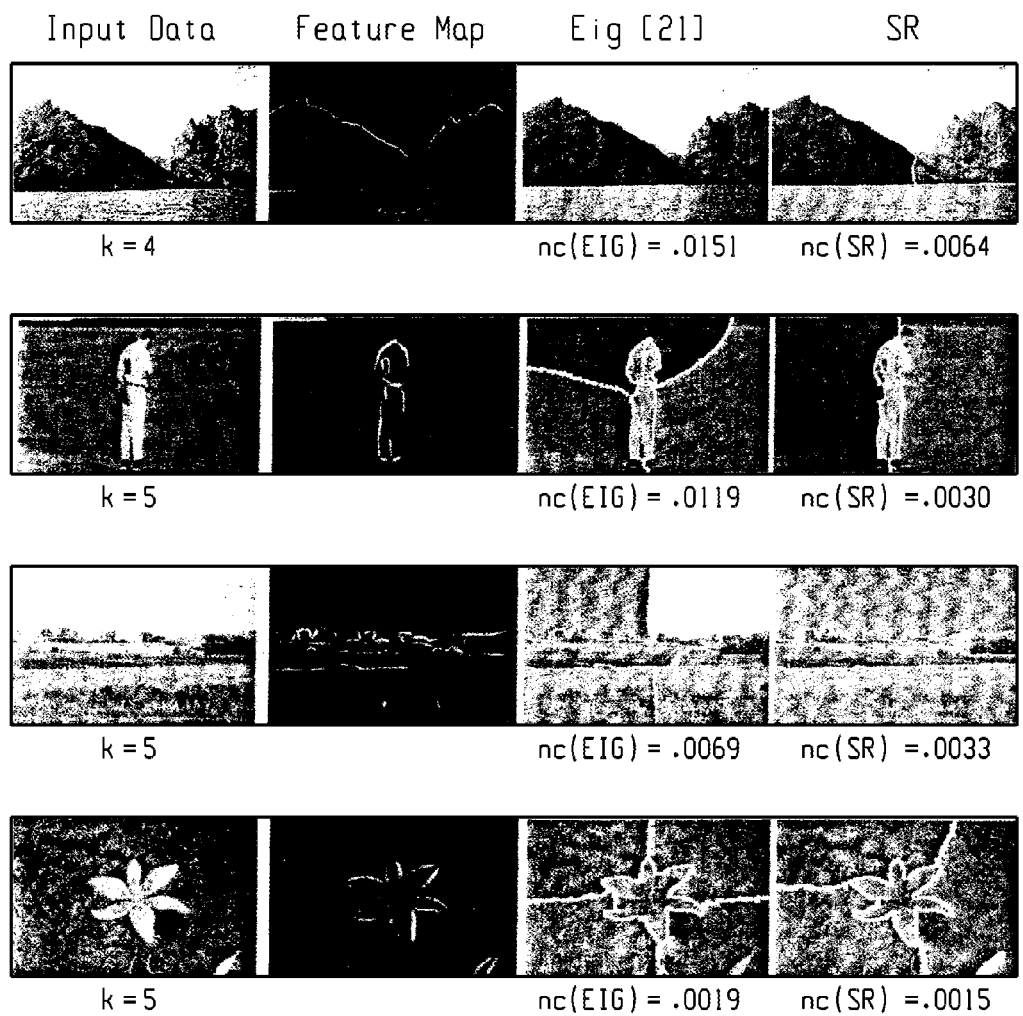
FIG. 4 represents experimental results. Each row illustrates through qualitative examples the improvements in NCut value for natural images. Column three contains segmentations generated by the published code of Yu and Shi [20]. Column four contains results for the presently disclosed spectral rounding method. The number of segments k is fixed for each comparison. We emphasize that the cut cost was evaluated on identical combinatorial problems (graphs).

We compiled a set of 100 images from Google Images using the keywords farm, sports, flowers, mountains, and pets. Examples from this data set, and segmentations, can be found in FIG. 4. We note that changes in the cut value often correlate with large changes in the co-membership relationships on the image pixels. To quantitatively compare the methods on natural images, we report the divergence distance and NCut improvement factor c.

Table 1 below is a comparison between the disclosed spectral rounding SR method and the multiway cut algorithm of Yu and Shi [20] EIG on segmentations of natural images. The average cluster entropy over SR-segmentations of the image collection is 1.62±0.4.

|  | $D_{vi}$ (SR, Eig) | nc (SR) = c · nc (EIG) |
|---|---|---|
| geo-graph | 1.23 +/− .160 | c = .536 +/− .201 |

Additional examples are found in Tolliver, et al. "Graph Partitioning by Spectral Rounding: Applications in Image Segmentation and Clustering" appearing in Computer Vision and Pattern Recognition 2006: pp 1053-1060, which is hereby incorporated by reference for all purposes.

The following are incorporated herein by reference:

[1] K. Anstreicher and H. Wolkowicz. On lagrangian relaxation of quadratic matrix constraints. *SIAM Journal Matrix Analysis Applications*, 22(1):44-55, 2000.

[2] Sanjeev Arora, Satish Rao, and Umesh V. Vazirani. Expander flows, geometric embeddings and graph partitioning. *In STOG*, pages 222-231, 2004.

[3] F. R. Bach and M. I. Jordan, learning spectral clustering, with application to speech separation, volume 7, pages 1963-2001, 2006.

[4] Tony F. Chan, John R. Gilbert, and Shang-Hua Teng. Geometric spectral bisection. Manuscript, July 1994.

[5] F. R. K. Chung. *Spectral graph theory*. Number 92 in Regional Conference Series in Mathematics. Amer. Math. Soc, Providence, 1992.

[6] J. W. Demmel. *Applied Numerical Linear Algebra*. SIAM, 1st edition, 1997.

[7] C. Fowlkes, S. Belongie, F. Chung, and J. Malik. Efficient spatiotemporal grouping using the nystrom method. *In PAMI*, December 2003.

[8] Karypis G. and K. Vipin. A fast and high quality multilevel scheme for partitioning irregular graphs. [9] S. Guattery and G. L Miller. On the quality of spectral separators. Matrix Analysis (0 Applications, 19(3), 1998.

[10] M. Jerrum and Alistair Sinclair. Approximating the permanent. *SIAM J. Gornput.*, 18(6):1149-1178, 1989.

[11] K. Lang and S. Rao. A flow-based method for improving the expansion or conduectance of graph cuts. *Integer Programming and Gombinatorial Optimization*, pages 325-337, June 2004.

[12] F. T. Leighton and S. Rao. An approximate max-flow min-cut theorem for uniform multicommodity flow problems with applications to approximation algorithms. *In FOGS*, pages 422-431. IEEE, October 1988.

[13] A. Ng, M. Jordan, and Y. Weiss. On spectral clustering: Analysis and an algorithm. *In NIPS*, 2002.

[14] Y. Saad. *Iterative methods for sparse linear systems*. PWS, 1st edition, 1996.

[15] J. Shi and J. Malik. Normalized cuts and image segmentation. *In PAMI*, 2000.

[16] D. Spielman and S. H. Teng. Nearly linear time algorithms for graph partitioning, graph sparsification, and solving linear systems. *STOC*, pages 81-90, 2004.

[17] D. A. Tolliver and G. L. Miller. Graph partitioning by spectral rounding: applications in image segmentation and clustering. *IEEE Computer Vision and Pattern Recognition*, pages 1053-1060, June 2006.

[18] David Tolliver. *Spectral Rounding & Image Segmentation*. PhD thesis, Robotics Institute, Carnegie Mellon University, Pittsburgh, Pa., August 2006.

[19] E. P. Xing and M. I. Jordan. On semidefinte relaxtion for normalized k-cut and connections to spectral clustering. TR-CSD-03-1265, University of California Berkeley, 2003.

[20] S. Yu and J. Shi. Multiclass spectral clustering. In *ICCV*, October 2003.

While the present invention has been disclosed in conjunction with preferred embodiments thereof, those of ordinary skill in the art will recognize that many modifications and variations are possible. The present document is intended to be limited only by the scope of the following claims.

What is claimed is:

1. A processor-implemented method of partitioning a weighted combinatorial graph representative of a dataset, comprising:
   generating a generalized Laplacian matrix corresponding to the combinatorial graph using one or more data processors, the combinatorial graph having a plurality of weighting factors;
   wherein a weighting factor is associated with an edge in the combinatorial graph, and corresponds to a similarity of vertices that said edge connects;
   computing an eigenstructure of said generalized Laplacian matrix using the one or more data processors;
   determining, using the one or more data processors, if an end criterion is satisfied, said end criterion being satisfied when the combinatorial graph is partitioned and when eigenvalues of the eigenstructure reach a predetermined condition, and if said end criterion is not satisfied:
   calculating new values for at least some of said plurality of weighting factors using said eigenstructure using the one or more data processors;
   updating the combinatorial graph based on said new values for at least some of said plurality of weighting factors using the one or more data processors; and
   returning to said generating step.

2. The method of claim 1 wherein said generalized Laplacian matrix includes a normalized Laplacian matrix, and wherein the normalized Laplacian matrix of a combinatorial graph G is given by the equation $L=D^{\wedge}(-\frac{1}{2})*(D-W)*D^{\wedge}(-\frac{1}{2})=D^{\wedge}(-\frac{1}{2})*L*D^{\wedge}(-\frac{1}{2})$, where D is a weighted degree matrix and W is a weighted adjacency matrix, and wherein:
   said computing the eigenstructure includes solving $Lf=\lambda_k Df$ where $\lambda_k$ represents the $k^{th}$ smallest associated eigenvalue and $f$ represents an eigenvector.

3. The method of claim 2 wherein said end criterion is satisfied when the eigenvalue $\lambda_k$ equals zero.

4. The method of claim 2 wherein said computing the eigenstructure for the Laplacian matrix after the updating of the combinatorial graph with said new values for at least some of said weighting factors includes solving $L'f=\lambda_k D'f$.

5. The method of claim 2 additionally comprising computing an additional eigenvalue and eigenvector of said generalized Laplacian matrix, and wherein said determining and calculating are responsive to both eigenvalues and eigenvectors.

6. The method of claim 2 wherein said calculating new values for at least some of said plurality of weighting factors includes calculating new values that satisfy a Rayleigh quotient constraint, wherein the Rayleigh quotient constraint requires that $(f^T L' f)/(f^T D' f)$ be less than $(f^T L f)/(f^T D f)$, wherein L' is a normalized Laplacian matrix of a reweighted combinatorial graph, and wherein D' is a weighted degree matrix for the reweighted combinatorial graph.

7. The method of claim 1 wherein said calculating new values for at least some of said plurality of weighting factors includes solving the equation:

$$w'_{ij} = \beta((f_i^2 + f_j^2)/(f_i - f_j)^2) w_{ij}$$

where $\beta(x)$ is a monotone function and $w'_{ij}$ is the new weighting value, $w_{ij}$ is the old weighting value, and $f$ represents an eigenvector.

8. A processor-implemented method of segmenting an image represented by a dataset, comprising:
constructing a combinatorial graph from the dataset, said graph having a plurality of weighting factors using a data processor;
wherein a weighting factor is associated with an edge in the combinatorial graph, and corresponds to a similarity of vertices that said edge connects;
generating a generalized Laplacian matrix corresponding to the combinatorial graph using the data processor;
computing an eigenstructure including an eigenvalue and an eigenvector of said generalized Laplacian matrix using the data processor;
determining if an end criterion is satisfied, said end criterion being satisfied when said image is segmented and when eigenvalues of the eigenstructure reach a predetermined condition, and if said criterion is not satisfied;
calculating new values for at least some of said plurality of weighting factors using said eigenvector using the data processor;
updating the combinatorial graph based on said new values for at least some of said weighting factors using the data processor; and
returning to said generating step.

9. The method of claim 8 wherein the Laplacian matrix of a combinatorial graph G is given by the equation $L = D - W$, where D is a weighted degree matrix, and W is a weighted adjacency matrix, and wherein:
said computing a generalized eigenvalue and an eigenvector of the normalized Laplacian matrix includes solving $Lf = \lambda_k D f$
where $\lambda_k$ represents an eigenvalue and $f$ represents an eigenvector.

10. The method of claim 9 wherein said end criterion is satisfied when the eigenvalue $\lambda_k$ equals zero.

11. The method of claim 9 wherein said computing an eigenvalue and an eigenvector of the normalized Laplacian matrix after the updating of the combinatorial graph with said new values for at least some of said weighting factors includes solving $L'f = \lambda_k D'f$.

12. The method of claim 8 additionally comprising computing an additional eigenvalue and eigenvector of said generalized Laplacian matrix, and wherein said determining and calculating are responsive to both eigenvalues and eigenvectors.

13. The method of claim 9 wherein said calculating new values for at least some of said plurality of weighting factors includes calculating new values that satisfy a Rayleigh quotient constraint, wherein the Rayleigh quotient constraint requires that $(f^T L' f)/(f^T D' f)$ be less than $(f^T L f)/(f^T D f)$, wherein L' is a normalized Laplacian matrix of a reweighted combinatorial graph, and wherein D' is a weighted degree matrix for the reweighted combinatorial graph.

14. The method of claim 8 wherein said calculating new values for at least some of said plurality of weighting factors includes solving the equation:

$$w'_{ij} = \beta((f_i^2 + f_j^2)/(f_i - f_j)^2) w_{ij}$$

where $\beta(x)$ is a monotone function and $w'_{ij}$ is the new weighting value, $w_{ij}$ is the old weighting value, and $f$ represents an eigenvector.

15. A non-transitory computer-readable medium storing a set of instructions, which when executed, perform a method of partitioning a weighted combinatorial graph representative of a dataset, said method comprising:
generating a generalized Laplacian matrix corresponding to the combinatorial graph, the combinatorial graph having a plurality of weighting factors;
wherein a weighting factor is associated with an edge in the combinatorial graph, and corresponds to a similarity of vertices that said edge connects;
computing an eigenstructure of said generalized Laplacian matrix;
determining if an end criterion is satisfied, said end criterion being satisfied when the combinatorial graph is partitioned and when eigenvalues of the eigenstructure reach a predetermined condition, and if said end criterion is not satisfied;
calculating new values for at least some of said plurality of weighting factors using said eigenstructure;
updating the combinatorial graph based on said new values for at least some of said weighting factors; and
returning to said generating step.

16. A non-transitory computer-readable medium storing a set of instructions, which when executed, perform a method of segmenting an image represented by a dataset, comprising:
receiving a dataset;
constructing a combinatorial graph from the dataset, said graph having a plurality of weighting factors;
wherein a weighting factor is associated with an edge in the combinatorial graph, and corresponds to a similarity of vertices that said edge connects;
generating a generalized Laplacian matrix corresponding to the combinatorial graph;
computing an eigenstructure including an eigenvalue and an eigenvector of said generalized Laplacian matrix;
determining if an end criterion is satisfied, said end criterion being satisfied when said image is segmented and when eigenvalues of the eigenstructure reach a predetermined condition, and if said criterion is not satisfied;
calculating new values for at least some of said plurality of weighting factors using said eigenvector;
updating the combinatorial graph based on said new values for at least some of said weighting factors; and
returning to said generating step.

17. The method of claim 1, wherein the method of partitioning the weighted combinatorial graph segments a portion of an image from a remainder of the image.

18. The method of claim 17, wherein each pixel of the image forms a vertex in the combinatorial graph.

19. The method of claim 1, wherein the method of partitioning the weighted combinatorial graph decomposes a signal representative of audio data into segments.

20. The method of claim 19, wherein each word or syllable in the audio data forms a component in the combinatorial graph.

21. The method of claim 1, wherein the method of partitioning the weighted combinatorial graph decomposes a signal representative of volumetric data into segments.

22. The method of claim 1, wherein the method of partitioning the weighted combinatorial graph segments social network data.

23. The method of claim 22, wherein each of the plurality of weighting factors corresponds to a frequency of emails between parties.

24. The method of claim 1, wherein the method of partitioning the weighted combinatorial graph segments a medical scan or a scientific scan.

25. The method of claim 1, wherein the eigenvalues reach the predetermined condition when a linear combination of the eigenvalues is not decreased by a subsequent reweighting process.

26. The method of claim 8, wherein the eigenvalues reach the predetermined condition when a linear combination of the eigenvalues is not decreased by a subsequent reweighting process.

27. A processor-implemented method of partitioning a weighted combinatorial graph representative of a dataset, comprising:
- generating a generalized Laplacian matrix corresponding to the combinatorial graph using one or more data processors, the combinatorial graph having a first plurality of weighting factors;
- wherein a weighting factor is associated with an edge in the combinatorial graph, and corresponds to a similarity of vertices that the edge connects;
- computing an eigenstructure of the generalized Laplacian matrix using the one or more data processors, the eigenstructure having a first set of eigenvalues associated with the first plurality of weighting factors;
- calculating a second plurality of weighting factors using the one or more data processors, the eigenstructure having a second set of eigenvalues associated with the second plurality of weighting factors;
- wherein at least one of the second plurality of weighting factors is different from the first plurality of weighting factors;
- when a linear combination of the second set of eigenvalues is less than a linear combination of the first set of eigenvalues,
    - updating the combinatorial graph based on the second plurality of weighting factors using the one or more data processors; and
    - returning to the generating step.

28. A processor-implemented method of segmenting an image represented by a dataset, comprising:
- constructing a combinatorial graph from the dataset using a data processor, said graph having a first plurality of weighting factors;
- wherein a weighting factor is associated with an edge in the combinatorial graph, and corresponds to a similarity of vertices that said edge connects;
- generating a generalized Laplacian matrix corresponding to the combinatorial graph using the data processor;
- computing an eigenstructure of said generalized Laplacian matrix using the data processor, the eigenstructure having a first set of eigenvalues associated with the first plurality of weighting factors;
- calculating a second plurality of weighting factors using the data processor, the eigenstructure having a second set of eigenvalues associated with the second plurality of weighting factors;
- wherein at least one of the second plurality of weighting factors is different from the first plurality of weighting factors;
- when a linear combination of the second set of eigenvalues is less than a linear combination of the first set of eigenvalues,
    - updating the combinatorial graph based on the second plurality of weighting factors using the data processor; and
    - returning to said generating step.

* * * * *